(12) United States Patent
Lugt et al.

(10) Patent No.: US 11,525,481 B2
(45) Date of Patent: Dec. 13, 2022

(54) ROLLING BEARING ARRANGEMENT, DEVICE AND METHOD FOR DETERMINING A USED AND/OR REMAINING PERIOD OF A GREASE LIFE-TIME

(71) Applicant: Aktiebolaget SKF, Gothenburg (SE)

(72) Inventors: Pieter Martin Lugt, Vianen (NL); Rob Bosman, Enschede (NL); Yuxin Zhou, Song Yuan (CN)

(73) Assignee: Aktiebolaget SKF, Gothenburg (SE)

( * ) Notice: Subject to any disclaimer, the term of this patent is extended or adjusted under 35 U.S.C. 154(b) by 921 days.

(21) Appl. No.: 16/263,021

(22) Filed: Jan. 31, 2019

(65) Prior Publication Data

US 2019/0234463 A1 Aug. 1, 2019

(30) Foreign Application Priority Data

Feb. 1, 2018 (DE) .......................... 102018201573.2

(51) Int. Cl.
*F16C 19/52* (2006.01)
*F16C 33/66* (2006.01)
*G01M 13/04* (2019.01)

(52) U.S. Cl.
CPC ........ *F16C 33/6633* (2013.01); *F16C 19/522* (2013.01); *F16C 19/525* (2013.01);
(Continued)

(58) Field of Classification Search
CPC .. F16C 19/522; F16C 19/525; F16C 33/6625; F16C 33/6633; F16C 2233/00;
(Continued)

(56) References Cited

U.S. PATENT DOCUMENTS

2005/0246150 A1 11/2005 Shiromaru et al.

FOREIGN PATENT DOCUMENTS

CN 1659427 A 8/2005
CN 1934433 A 3/2007
(Continued)

OTHER PUBLICATIONS

A Master Curve for the Shear Degradation of Lubricating Greases with a Fibrous Structure Tribology Transactions 2019, vol. 62, No. 1, 78-87 https://doi.org/10.1080/10402004.2018.1496304.
(Continued)

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A rolling bearing arrangement having a first and a second raceway element, and rolling bodies being arranged between the two raceway elements so that the two raceway elements are rotatable against each other in the manner of a rolling bearing, a space between the raceway elements in which the rolling bodies are rolling off comprising a lubricating grease, at least one sensor element for sensing temperature, at a specific point of the rolling bearing, particularly in the space, and for sensing speed of the rolling bearing and a unit receiving the sensed temperature and speed, calculating from the profiles of the sensed temperature over time and from the speed over time via a calculated energy imposed on the grease a used and/or remaining period of the grease life-time.

16 Claims, 7 Drawing Sheets

(52) U.S. Cl.
CPC ......... *F16C 33/6625* (2013.01); *G01M 13/04* (2013.01); *F16C 2233/00* (2013.01); *F16C 2240/06* (2013.01); *F16C 2240/08* (2013.01); *F16C 2240/26* (2013.01); *F16N 2200/10* (2013.01)

(58) Field of Classification Search
CPC . F16C 2240/06; F16C 2240/08; G01M 13/04; G01P 3/443; F16N 2200/10; F16N 2210/14
See application file for complete search history.

(56) References Cited

FOREIGN PATENT DOCUMENTS

| | | | | |
|---|---|---|---|---|
| CN | 103335917 A | 10/2013 | | |
| CN | 105209796 A | 12/2015 | | |
| CN | 105298587 A | 2/2016 | | |
| CN | 105899945 A | 8/2016 | | |
| CN | 106370556 A | 2/2017 | | |
| CN | 106769666 A | 5/2017 | | |
| DE | 102010002294 A1 | * | 8/2011 | ............ G01M 13/04 |
| JP | 2001318079 A | 11/2001 | | |
| JP | 2004085451 A | 3/2004 | | |
| JP | 2016098996 A | 5/2016 | | |
| JP | 2017133950 A | 8/2017 | | |

OTHER PUBLICATIONS

Lubrication Engineering, Apr. 2007, vol. 32 No. 4, A Study for Determining the Yield Stress of Lithium Lubricating Grease, Li Jing Chen Guangjin Liu Qinglian Wu Baojie, 1. China University of Petroleum (Beijing), Beijing 102249, China;, 2. Tianjin Branch,Lubricant Company, Sinopec Corp., Tianjin 300480,China.

* cited by examiner

ROLLING BEARING ARRANGEMENT, DEVICE AND METHOD FOR DETERMINING A USED AND/OR REMAINING PERIOD OF A GREASE LIFE-TIME

CROSS-REFERENCE

This application claims priority to German patent application no. 102017219823.0 filed on Feb. 1, 2018, the contents of which are fully incorporated herein by reference.

TECHNOLOGICAL FIELD

The present invention relates to a rolling bearing arrangement, device and/or method for determining a used and/or remaining period of a grease life-time.

BACKGROUND

Reliable operation of mechanical systems particularly of rolling bearings is highly dependent on correct lubrication. Particularly for systems designed to operate for long periods with little maintenance, the condition of the lubricating grease is a key factor.

Thereby it is one core cognition of the present invention that a more precise determination requires to go in the calculation via an equivalent of the imposed energy onto the grease.

Another core cognition of this invention is that it is enough for this precise calculation to sense temperature and speed of the grease lubricated rolling bearing to derive in this precise determination via said energy model and mastercurve(s) being specific for the bearing geometry and the type respectively composition of the grease.

Grease is widely used as a lubricant in rolling bearings. It is often preferred over oil as it does not easily leak out of the bearing and has good sealing properties. After the churning phase, the grease forms reservoirs from which lubricant is released to the contacts to separate the rolling elements from the rings by a lubricant film. At some point in time, the grease is no longer able to lubricate which is called the end of grease life. Very often, the limited lifespan of the grease is determining the life of the bearing. This can be overcome by re-lubrication and a reasonable re-lubrication interval can be calculated using grease life models. Generally, grease life is determined by two effects: mechanical deterioration (the dominating mechanism at low and moderate temperature, e.g., below 70° C.) and chemical deterioration (mainly at high temperature, e.g., higher than 120° C.).

The mechanical degradation of the grease is mainly caused by pressure and shear. Grease may soften during aging and possibly leak out of the bearing; on the other hand, thickening/stiffening may occur, resulting in a loss of oil bleeding capacity. This grease aging behavior is highly dependent on the operating/working conditions (including temperature), the grease chemical composition and the grease thickener micro-structure.

A group of authors assumed a particle thickener microstructure, and described the degradation process using a fatigue model. Another group of authors aged soap greases using the roll stability test to study the breakdown of the thickener structure. They proposed an exponential model indicating that the decreasing rate of the change in grease consistency is proportional to the breakage rate of the thickener structure, i.e., the thickener geometry was used as a gauge to monitor the grease aging process. One author developed an empirical equation describing the drop of grease viscosity in terms of the amount of shear cycles applied. Using this author's equation, another author proposed a 'half-life' parameter to describe the grease aging inside a grease worker: the 'half-life' was defined as the time at which the grease has lost half of its initial viscosity. However, these empirical models are often limited to the specific aging test rigs and a universal aging model which is capable to describe the grease aging in various conditions still remains an open gap.

To give a common description of degradation dynamics, another group of authors employed entropy as a fundamental measure of degradation and applied this thermodynamic concept to characterize the degradation process of adhesive and fretting wear. Another group of authors applied this theory on the mechanical aging of grease. By shearing lithium complex greases in a rheometer at relatively low temperatures (25-45° C.), a linear relationship between the generated entropy and the grease aging behavior (change of consistency) was found. They later used this concept to build a shear life model, determined by the time at which a critical consistency would be reached. However, when performing pro-longed aging tests in a Couette Aging Machine, the results showed that this concept was not able to fully describe the grease shear aging process: the grease aging rate was found to decrease in time, ultimately showing asymptotic behavior where the aging process practically ends. This is plausible: after all, since the size of the thickener fibers decreases in time, there is a reduced probability for breakage of these fragmented fibers, resulting in a continuous reduction in the aging rate. Therefore, an exponential aging equation is proposed.

The mechanical aging tests described above were performed at relatively low temperatures, i.e., at the low ends of the 'green temperature window', where chemical degradation is not dominating. Apart from oxidation, grease will also experience 'thermal degradation'. Another group of authors worked on the thermal aging of lithium thickened greases. Their rheological evaluation and micro-structure measurements showed that at elevated temperature (150° C.), lithium grease was weakened, even in the absence of oxidation. The other author sheared lithium grease in a self-made viscometer observing that when aging at high temperatures, the influence of shearing on the grease viscosity loss is more pronounced. Another group of authors predicted the grease life of lithium soap thickened grease using thermogravimetry tests. They concluded that the activation energy based on Arrhenius' law is an appropriate parameter in grease life prediction. To summarize, to capture the mechanical aging of grease, not only the mechanical work put into the grease (shear) but also the temperature plays a role. A grease aging master curve should therefore take both factors into account.

To arrive at the cognition of this invention the shear degradation was studied at various temperatures by shearing fresh greases in a Couette Aging Machine at controlled temperatures and shear rates for different periods of time. In addition, to study pure thermal aging, fresh grease samples were baked in an oven at various temperatures in the absence of oxygen for different periods of time. The aged samples are then evaluated using a rheometer and Fourier Transform Infrared Spectroscopy (FTIR).

The results show that when taking account of the temperature, the previous entropy concept needs to be revised: elevated temperatures accelerate the aging due to the possible change of thickener properties. The Arrhenius equation should be used to include thermal effects rather than using the 'entropy concept'. Oxidation did not occur, which was confirmed by FTIR measurements. Based on this, a modified Grease Aging Master Curve has been developed and validated using a conventional grease worker test (ASTM D217) equipped with a load sensor to measure the force on the cylinder.

Finally, the Master Curve is used to describe the aging in full bearings, i.e., grease aged using a R0F+ grease tester equipped with deep groove ball bearings. The results show that although grease aging is more complex inside rolling bearings, the overall aging behavior demonstrates a similar trend as described by the proposed curve. Based on this, the application of the Master Curve on grease life prediction inside a deep groove ball bearing is illustrated.

SUMMARY

Therefore, it is one object of the present invention to create a rolling bearing arrangement, device and/or method for determining a used and/or remaining period of a grease life-time, which allows a more precise determination of the grease life in connection with cost-extensive hard- and software deriving this information among other things from operating parameters over time.

This object is solved by subject of claims 1, 8, 9 and 10. Further advantageous configurations are provided by the subjects of dependent claims.

BRIEF DESCRIPTION OF THE DRAWINGS

Further details are explained in the following with reference to the drawings. Thereby the drawings are showing.

DETAILED DESCRIPTION OF THE INVENTION

Two types of commercial greases with different thickeners and base oils were tested, i.e. a lithium complex soap grease with PAO base oil, denoted by LiX/PAO and polyurea thickened grease with ester base oil, denoted by PU/E. Both of the two greases have a fibrous thickener structure. Some relevant information about these greases is summarized in Table 1 (see also FIGS. 0a-0d). The micro-structure of the grease thickener is obtained using atomic force microscopy (AFM) in tapping mode.

TABLE 1

Figure 0A:
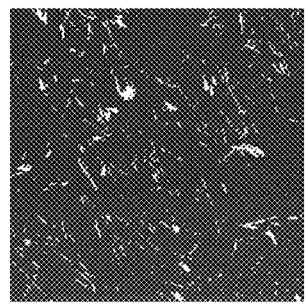
FIG. 0a shows an example of an atomic force microscopy (AFM) phase contrast according to one or more embodiments.
Figure 0B:
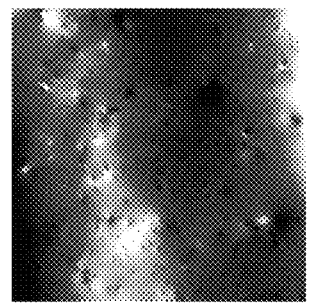
FIG. 0b shows an example of an AFM topography image according to one or more embodiments.
Figure 0C:
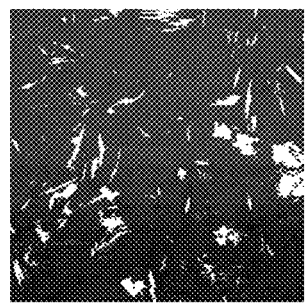
FIG. 0c shows an example of an AFM phase contrast according to one or more embodiments.
Figure 0D:
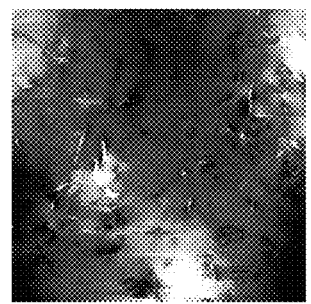
FIG. 0d shows an example of an AFM topography image according to one or more embodiments.
Figure 5:
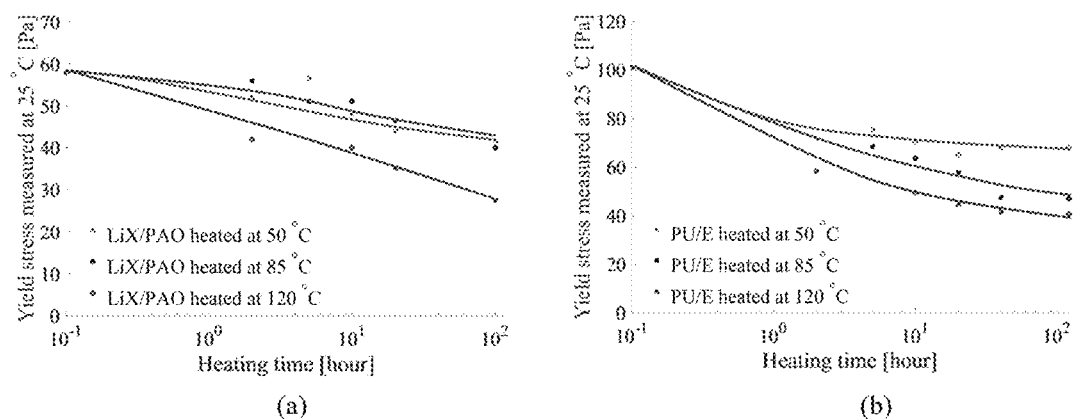
FIG. 5 shows pure thermal aging results: (a)LiX/PAO; (b)PU/E.
Figure 10:
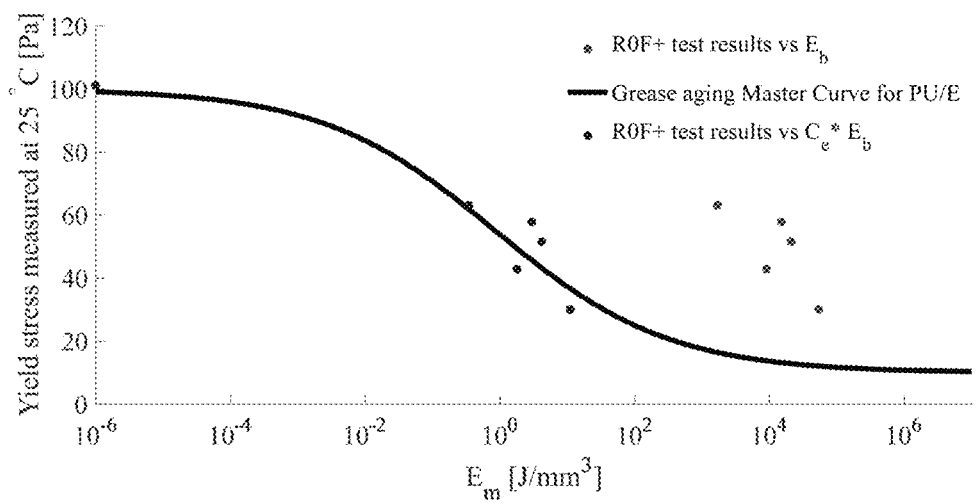
FIG. 10 shows PU/E R0F+ results and the Couette aging fit curve.

| Composition and properties of the tested greases | | | | | |
|---|---|---|---|---|---|
| Grease | Thickener | Base oil | NLGI | AFM phase contrast | AFM topography image |
| LiX/PAO | Lithium complex | PAO | 2-3 | FIG. 0a 10 × 10 µm | FIG. 0b |
| PU/E | Polyurea | Synthetic ester | 2-3 | FIG. 0c 5 × 5 µm | FIG. 0d |

During practical usage, grease experiences both shear and thermal stress. To perform grease aging both at controlled shear rates and temperatures, a new aging machine was designed and built. The machine is here referred to as the Couette Aging Machine.

Figure 1:
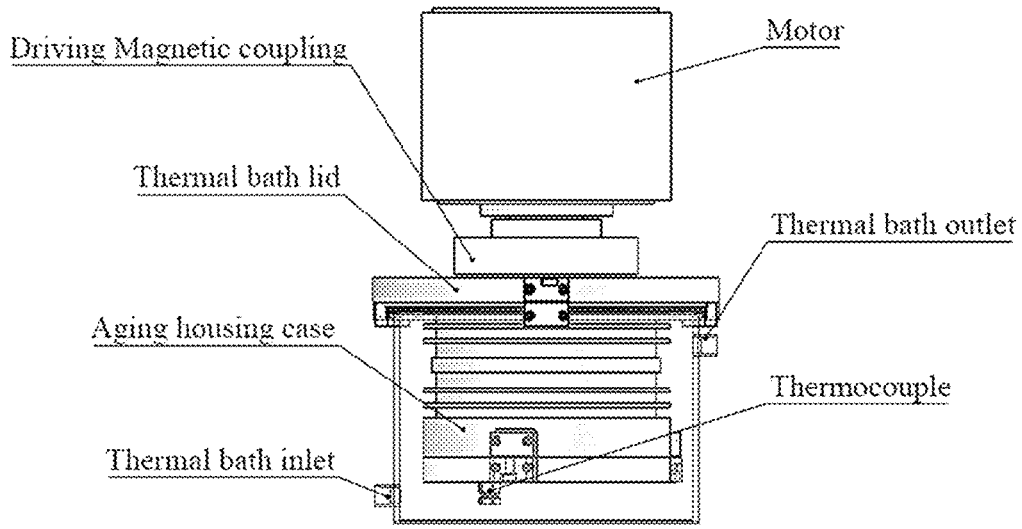
FIG. 1 shows a schematic drawing of the Couette Aging Machine.
Figure 2:
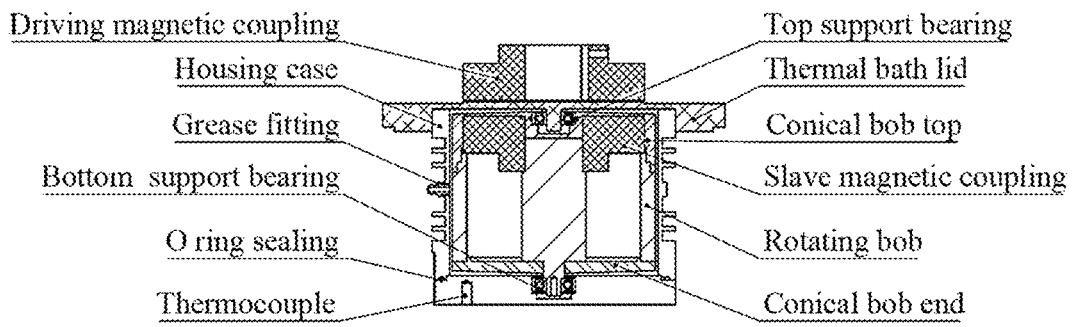
FIG. 2 shows a schematic drawing of the aging head.

FIG. 1 and FIG. 2 show a schematic overview of the Couette Aging Machine. To ensure homogeneous shear, the grease will be sheared between a cylindrical housing and a bi-conical bob. The angle of the conical end (top) was chosen such that a similar shear rate field will occur in the conical and cylindrical section of the working head. One of the challenges is keeping the grease in the Couette geometry, as due to the 'Weissenberg effect', the grease will flow upwards in the gap. This was accomplished by driving the rotating bob via a magnetic-coupling through a stainless-steel lid. Next, grease leakage, evaporation of base oil and oxidation of the grease are limited due to the airtight seal created by the lid and an o-ring. To ensure a proper alignment of the bob, two small ball bearings are placed inside the aging head. Before an aging test, fresh grease is injected via the grease fitting (FIG. 2). Once completely full, the aging head is closed and immersed in the thermal bath.

During aging, the temperature is recorded from the thermocouple at the bottom of the housing case, see FIG. 1 and FIG. 2. From the motor current, the torque and therefore the generated friction when shearing the grease can be calculated by subtracting the 'reference torque value', which was recorded when running the Couette Aging Machine with no grease filling inside the aging head.

According to the other group of authors, the shear aging behavior for lithium thickened grease at various shear rates and temperatures can be described by a single (master) curve using the entropy concept for different shear rates. To study the influence of temperature on aging, grease is aged at controlled temperatures for specific aging periods. The aging temperatures were chosen as 50° C., 85° C. and 120° C. The highest aging temperature was selected as 120° C., which is considered as the highest acceptable working temperature for standard lithium soap thickened grease in ball bearings. The aging shear rate was selected: $\dot{\gamma}_a=175$ s$^{-1}$. During the measurement, the input work W was calculated as:

$$W = \int \frac{M \cdot N \cdot 2\pi}{60} dt, \qquad (1)$$

where the torque M and rotational speed N (in rpm) were collected from the motor; t is the aging time in the unit of second.

In addition to the constant shear rate tests, to further verify that the aging process is independent from the applied shear rate, successive aging tests were performed on fresh PU/E using various shear rates. The aging conditions in the Couette Aging Machine are presented in Table 2.

TABLE 2

Shear aging condition

| | | | |
|---|---|---|---|
| Aging at constant shear rate $\dot{Y}_a = 175$ s$^{-1}$ | PU/E | 50° C. | 5 h, 25 h |
| | | 85° C. | 5 h, 8 h, 40 h |
| | | 120° C. | 5 h, 10 h, 50 h |
| | LiX/PAO | 50° C. | 5 h, 10 h, 25 h, 50 h |
| | | 85° C. | 10 h, 19 h, 50 h |
| | | 120° C. | 10 h, 17 h, 29 h |
| Mixed aging (PU/E) | | | Aged at 85° C., 350 s$^{-1}$ for 1 h, followed by aged at 50° C., 175 s$^{-1}$ for 1 h. |
| | | | Aged at 50° C., 175 s$^{-1}$ for 2 h, followed by aged at 25° C., 350 s$^{-1}$ for 2 h. |

Thermal aging tests were performed by inserting 11 grams of fresh grease into a glass case, sealed by aluminum foil. The sealed samples were subsequently heated in an oven for various temperatures. This makes it possible to investigate the influence of only temperature on the grease aging properties. Similar temperatures and time periods were selected as were used for the Couette Aging Machine tests. The test conditions are shown in Table 3. Before and after the thermal aging tests, the loaded cases were weighted to check the absence of evaporation. The weight loss was found less than 0.1% of the overall sample weight. Hence, the influence of oil evaporation on the thermal aging result can be neglected.

TABLE 3

Thermal aging condition

| | Heating time | |
|---|---|---|
| Temperature | LiX/PAO | PU/E |
| 50° C. | 2 h, 5 h, 8 h, 20 h, 100 h | 2 h, 5 h, 10 h, 20 h, 40 h, 120 h |
| 85° C. | 2 h, 5 h, 8 h, 20 h, 100 h | 2 h, 5 h, 10 h, 20 h, 40 h, 120 h |
| 120° C. | 2 h, 5 h, 8 h, 20 h, 100 h | 2 h, 5 h, 10 h, 20 h, 40 h, 120 h |

To study the grease aging inside a bearing, fresh PU/E was aged using a SKF R0F+ test rig. The R0F+ is a test rig for determining grease life, where two pairs of deep groove ball bearings (two test bearings and two support bearings) are tested under specific temperature, speed and load for prolonged running. Grease life is defined by the point in time when either the bearing temperature or the motor current exceeds a critical value. In these grease aging tests, the bearings were shielded and filled with approx. 30% of the bearing free volume using fresh PU/E (giving an initial fill volume of $V_b=1.6\times10^3$ mm$^3$). To avoid bearing failures (since the goal is to study grease degradation), the applied load should be relatively low, but higher than the minimum load of the bearings, to prevent skidding.

Figure 3:
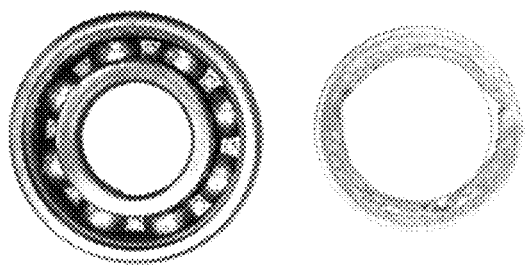
FIG. 3 shows a sample collection after R0F+ test.

Two test conditions were selected, under which the bearings were run for specific periods of time but always shorter than the estimated grease life. The R0F+ test conditions are shown in Table 4. Afterwards, the worked PU/E was collected from the bearing. Since the volumes are so small it was not possible to collect grease from specific locations. Most of the grease was collected on the inner surface of the shield as shown in FIG. 3.

TABLE 4

R0F + test condition

| | Axial load $F_a$ (N) | Radial load $F_r$ (N) | Rotational speed N (rpm) | Running time (hours) |
|---|---|---|---|---|
| Condition 1 | 500 | 50 | 10000 | 22, 195 |
| Condition 2 | 270 | 70 | 15000 | 100, 235, 600 |

To evaluate the change of grease properties from the aging tests, the yield stress was measured for fresh and aged grease samples in a MCR 501 Anton-Paar rheometer using a plate-plate geometry, with sandblasted surface to decrease wall-slip effects. Once the sample was loaded, pre-shear was applied following the DIN standard ($\dot{\gamma}_{ps}=100$ s$^{-1}$ for 60 s at 25° C.). After 30 minutes relaxation time, oscillatory strain sweep measurements were performed, where the shear strain ranged from 10$^{-3}$% to 10$^3$% at 1 Hz and 25° C. Based on the stress strain curve, the yield stress $\tau_y$ was obtained. In addition, to check if chemical reactions took place during aging, FTIR measurements were carried out for both fresh and aged samples.

The state of the art entropy concept was applied to describe the aging process of lithium soap grease (fibrous thickener structure) at multiple shear rates. There was no data to show that the concept would properly include the effect of temperature. Therefore, additional tests on the Couette Aging Machine for different temperatures have been conducted. In this section these measurements will be used to evaluate the entropy concept varying both temperature and shear.

The entropy density $S_g$ is calculated by dividing the input work W over the grease sample volume $V_a$ and the aging temperature T:

$$S_g = \frac{W/V_a}{T} \qquad (2)$$

Figure 4:
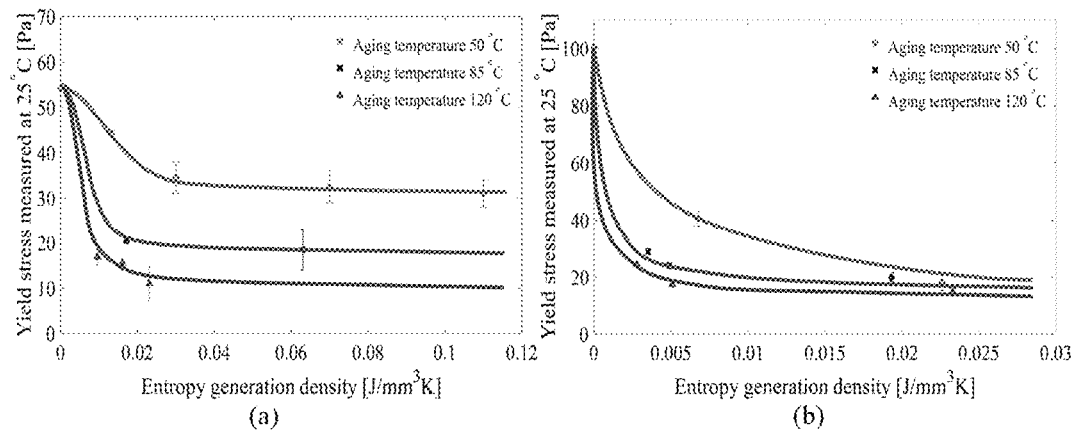
FIG. 4 shows yield stress vs Entropy generation density at various aging temperatures for LiX/PAO(a) and PU/E(b)

The yield stress variation during aging for both LiX/PAO and PU/E are shown in FIG. 4. As can clearly be seen, the LiX/PAO aging behavior at different aging temperatures can no longer be fit by the entropy concept and for every temperature, a different curve exists. In addition, grease aged at high temperature deteriorates faster than aged at low temperature, see FIG. 4-a. PU/E has a poor mechanical stability and indeed shows a fast deterioration. However, the difference in degradation rate between aging at 50° C. and 120° C. is still considerable, see FIG. 4-b. The thermal effect on grease aging was also observed by the other author: when sheared at elevated temperature (100° C.), more pronounced and faster viscosity drop took place compared to that sheared at room temperature. When performing the oscillating tests on lithium thickened grease, again another author also found similar temperature dependence: when the temperature exceeds 50° C., considerable decrease of the complex modulus was observed.

Since the grease deteriorates in a highly non-linear way and shows different phases of aging, the aged greases are not 'thermo-rheologically simple materials' and it is impossible to apply the time-temperature superposition strategy on FIG. 4 to get a master curve for the aging process at various temperatures.

The influence of temperature on grease properties was also observed by the other group of authors, where the thickener fibers became shorter and separated from each other for both Li and LiX greases. They concluded that high temperature makes the fibers more 'brittle' and thereby, the breakage of such fibers will be easier. Another group of authors have similar observations: after 7 days aging inside a beaker at 120° C., the thickener fibre length decreased from 1 μm to 0.1 μm, while the average fiber diameter increased from 30 nm to 50 nm Another group of authors pointed out that high temperature (80-120° C.) will result in weaker soap structure. Another group of authors attributed the fiber shortening of lithium soap based grease to the loss of physical bonding of thickener molecules at high temperature (120° C.). They also observed thickener melting after hundreds of hours' heating for urea grease. The other group of authors attributed the thermal effects on grease aging to different structure breakdown process compared to low temperature aging. These observations may very well explain why grease deteriorates faster at higher temperature: thermal weakening.

To study the effect of the elevated temperature on grease properties, time sweep isothermal aging tests were performed on fresh LiX/PAO and PU/E at 50° C., 85° C. and 120° C. The thermal aging results are shown in FIG. 5, where the yield stress variation at different temperatures was plotted against the logarithmic heating time. Clearly, for each temperature, the yield stress shows a descending trend versus the heating time. A similar thermal effect was also found by the other group of authors: both lithium soap grease and urea grease showed a descending apparent viscosity with heating time. In addition, when baked at higher temperature, the descending rate is accelerated, which agrees with the Couette Aging Machine test observation as shown in FIG. 4.

The three isothermal aging curves in FIG. 5 could be merged together by correcting the thermal aging time t (in the unit of hour) with an 'Arrhenius correction factor' $C_T$ at a reference temperature $T_0$:

$$\text{for } LiX/PAO \; C_T = 2^{\frac{T-T_0}{15}} \text{ and for } PU/E \; C_T = 2^{\frac{T-T_0}{10}}.$$

Figure 6:
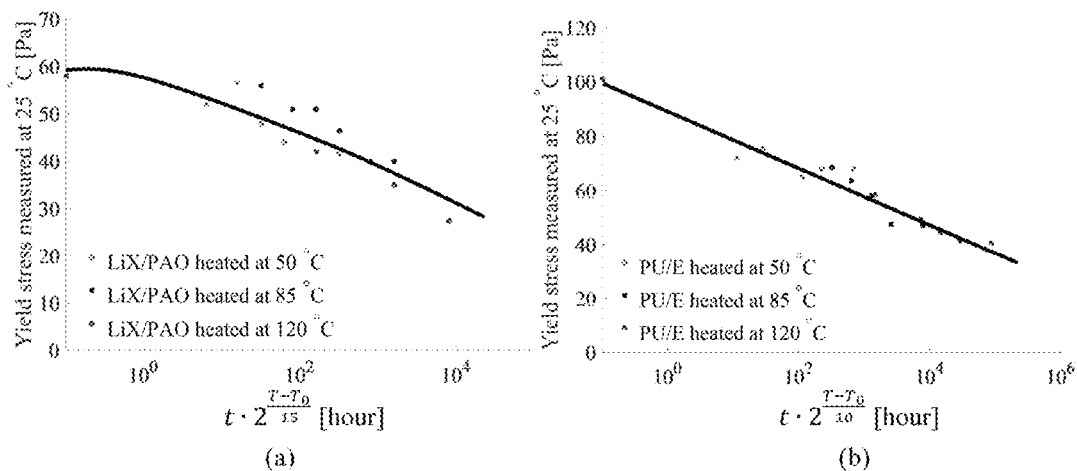
FIG. 6 shows pure thermal aging results using the Arrhenius correction factor: (a)LiX/PAO; (b)PU/E.

In the current study, the room temperature 25° C. is selected as the reference value so $T_0=25°$ C. In this way, the isothermal heating time is transferred to the heating time at reference temperature and a temperature independent curve is constructed, see FIG. 6. This reduction in yield stress with increasing temperature is likely to be one of the reasons for the reduction in grease life with increasing temperature. It is apparent that the factor of 10 and 15° C. for a reduction in yield stress with a factor of 2 is similar to that for a reduction in grease life with a factor 2.

To conclude, in the absence of oxygen, when heated below 120° C., no chemical reaction was detected for the studied greases, using FTIR. The thermal aging results show that the grease aging is a function of the temperature and an increase in temperature will accelerate the aging process. This thermal effect can be described using Arrhenius law.

It was shown above that the entropy concept is not suitable to describe the grease aging at different temperatures and that in the absence of oxygen, the grease thermal aging can be described as a function of temperature by correcting the isothermal heating time using the Arrhenius correction factor $C_T$. When evaluating the grease aging inside the Couette Aging Machine, the input work was calculated by integrating the product of torque and speed over the aging time (equation 1). Hence it is logical to use the applied work with an Arrhenius temperature correction (here termed as 'corrected energy density $E_m$') as a Master Curve for the mechanical aging of grease taking account of both temperature and shear effects.

The corrected energy density $E_m$ then reads:

$$E_m = \frac{C_T \cdot W}{V_a}, \quad (3)$$

where W is the mechanical work, $C_T$ is the Arrhenius correction factor which was derived from the pure thermal aging tests and $V_a$ is the grease volume inside the Couette Aging Machine. Here the reference temperature is again $T_0=25°$ C. Note that the unit for $E_m$ is J/mm³.

Figure 7:
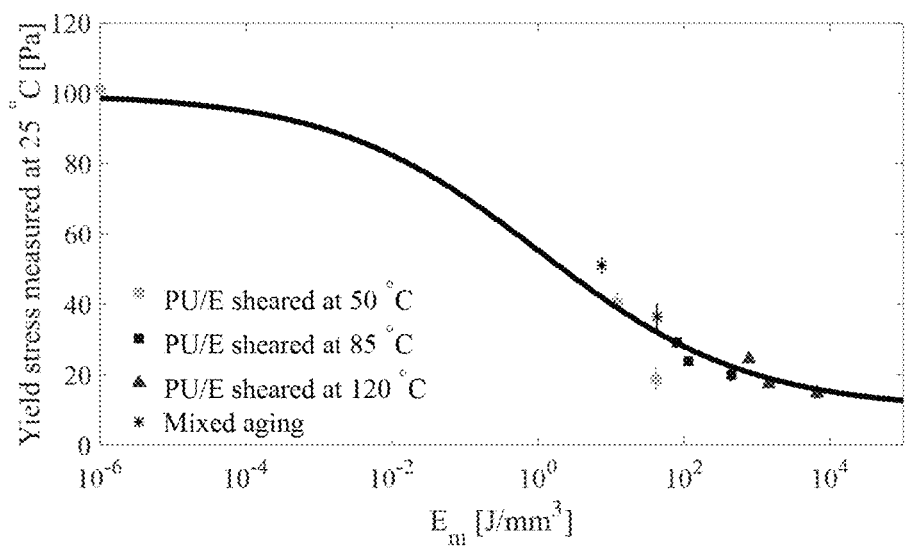
FIG. 7 shows yield stress vs E_m for PU/E aged inside the Couette Aging Machine.
Figure 8:
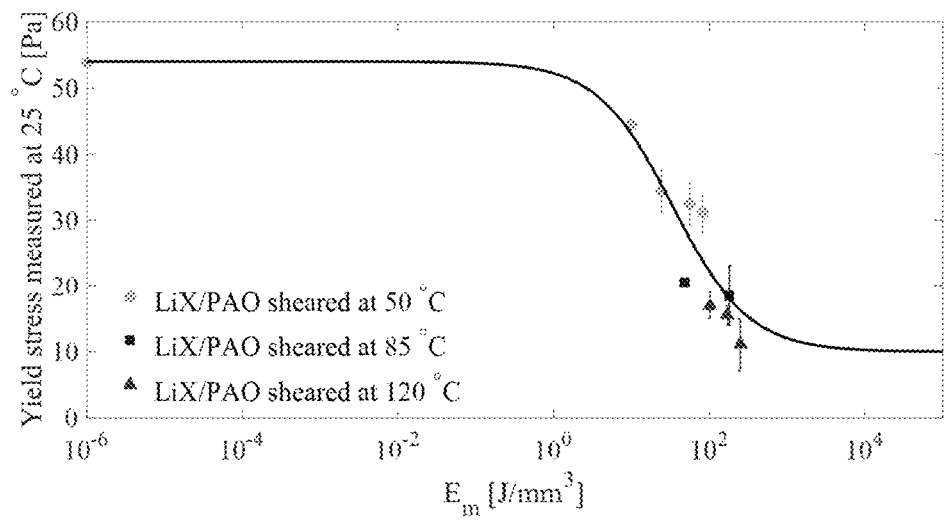
FIG. 8 shows yield stress vs E_m for LiX/PAO aged inside the Couette Aging Machine.

The aging results for PU/E and LiX/PAO in terms of $E_m$ are presented in FIG. 7 and FIG. 8. As shown in the figures, when plotted against the corrected energy density $E_m$: a progressive degradation phase at the beginning, and slower degradation afterwards. Therefore, the previous developed grease aging model is applicable, where the generated entropy density $S_g$ is replaced by the corrected energy density $E_m$:

$$Y = \frac{Y_i - Y_\infty}{1 + K \cdot E_m^n} + Y_\infty, \quad (4)$$

where Y represents the rheological property (here is the yield stress), with the index i representing the initial rheological value for fresh grease, and ∞ representing the second stage value for the long time aged sample; K and n are the coefficient of degradation and the exponent of degradation obtained from the curve fitting. This aging model fits well for both PU/E and LiX/PAO, see FIG. 7, FIG. 8 and Table 5. Clearly, when applying the corrected energy density $E_m$, the grease aging behavior inside the Couette Aging Machine can now be described independent of the aging shear rate and aging temperature.

TABLE 5

Parameters for the Master Curve Equation

|  | $Y_i$ ($\tau_y$, Pa) | $Y_\infty$ ($\tau_y$, Pa) | K | n | Goodness value $R^2$ |
|---|---|---|---|---|---|
| LiX/PAO | 54 | 10 | 0.04 | 0.89 | 0.94 |
| PU/E | 100 | 10 | 1.1 | 0.34 | 0.97 |

To characterize the aging behavior of different greases, the fast aging phase is of particular interest: a grease with a higher degradation coefficient K and exponent n is more fragile and sensible to shear. Reaching the second phase of grease degradation inside a bearing does not necessarily mean the end of grease/bearing life. After all, this does not mean that the fragmented thickener, together with the base oil, no longer function as a lubricant. On the contrary, it was earlier shown that grease with smaller thickener particles generates thicker films than grease with larger thickener particles. However, the destruction of the thickener network has an effect on oil bleed and grease consistency, which again has an impact on the grease performance.

So far, the grease aging model has been developed from the in-house-made Couette Aging Machine, where grease is subjected to uniform shear only. To check if this concept can be more widely applied, the Master Curve was also applied to a conventional grease worker where fresh grease was aged at the reference temperature 25° C. varying the number of strokes as listed in Table 6 (DIN ISO D217). This validation test was only carried out using PU/E.

TABLE 6

Aging strokes for PU/E inside the DIN grease worker

| Number of strokes | 131 | 655 | 6550 | 13100 | 131000 |
|---|---|---|---|---|---|

To measure the input energy for the grease worker, the generated friction load $F_{gw}$ during the aging process was recorded by a load cell mounted under the grease worker container. The input energy density $E_{gw}$ was calculated by summing the product of the load $F_{gw}$ and the piston displacement $L_{piston}$ during the aging process, divided by the grease volume inside the container $V_{gw}$:

$$E_{gw} = \frac{\sum F_{gw} \cdot L_{piston}}{V_{gw}} \qquad (5)$$

Figure 9:
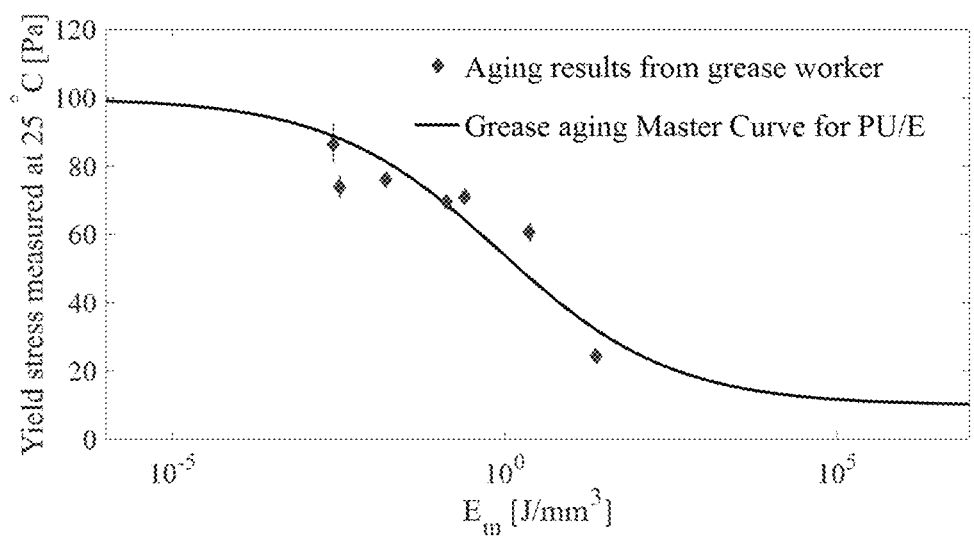
FIG. 9 shows validation of grease aging Master Curve for PU/E inside a grease worker.

The yield stress of fresh and aged PU/E was plotted against the input energy and the result fits very well with the grease aging Master Curve, see FIG. 9. This suggests that the Master Curve is generally applicable for prediction/describing the mechanical aging of grease.

In the following, the Master Curve is applied to the grease aging inside a rolling bearing. The grease flow inside a rolling bearing consists of two phases. After filling the bearing with grease and starting-up, the grease will first experience a 'churning phase', where a large fraction of the grease will be churned and moved towards the 'unswept area'. Part of the grease is trapped within the rolling elements or adjacent to the raceways, experiencing continuous shear, functioning as lubricant reservoir for the lubricant. At the end of this phase, most of the grease has ended up under the cage, on the shield/seal inner surface and bearing shoulders. During the next phase, a fraction of the grease from the reservoirs may fall back into the contact area by e.g. vibrations, cage scraping or shear caused by (gently) touching the rolling elements. Hence the grease will not be uniformly aged inside a rolling bearing and the calculation of the imposed mechanical work on the grease in a rolling bearing will not be straightforward.

The aging test in a rolling bearing was performed via the R0F+ test, using PU/E grease in deep groove ball bearings (6204-2Z) for different periods of running time under two test conditions (Table 4). The yield stress for the grease after the bearing test are shown in Table 7. The yield stress decreases as a function of time, similar to aging the grease in the Couette Aging Machine or grease worker.

TABLE 7

R0F + test results for PU/E

| Sample | Yield stress measured at 25° C. (Pa) | Bearing frictional torque M (N · m) | Bearing friction energy density $E_b$ (Jmm$^{-3}$) | Correcting factor $C_e$ |
|---|---|---|---|---|
| Fresh PU/E | 100 | 0 | 0 | 0 |
| 22 h 120° C. 10000 rpm $F_a$ = 500N $F_r$ = 50N | 63 | 33.7 × 10$^{-3}$ | 1.7 × 10$^3$ | 0.00011 |
| 100 h 120° C. 15000 rpm $F_a$ = 270N $F_r$ = 70N | 43 | 25.5 × 10$^{-3}$ | 9 × 10$^3$ | 0.0004 |
| 195 h 120° C. 10000 rpm $F_a$ = 500N $F_r$ = 50N | 57.8 | 33.7 × 10$^{-3}$ | 1.5 × 10$^4$ | 0.00011 |
| 235 h 120° C. 15000 rpm $F_a$ = 270N $F_r$ = 70N | 51.6 | 25.5 × 10$^{-3}$ | 2.1 × 10$^4$ | 0.0004 |
| 600 h 120° C. 15000 rpm $F_a$ = 270N $F_r$ = 70N | 30 | 25.5 × 10$^{-3}$ | 5.4 × 10$^4$ | 0.0004 |

The friction energy density inside the bearing $E_b$ was calculated by integrating the product of frictional torque M and angular speed over time (equation 1) divided by the total initial grease filling volume $V_b$. For the R0F+ shielded bearing, the frictional torque M is obtained by making use of the SKF model:

$$M = M_{rr} + M_{sl}, \qquad (6)$$

where $M_{rr}$ is the rolling frictional moment and $M_{sl}$ is the sliding frictional moment.

The SKF friction torque model was developed for steady state running condition, i.e., after the 'churning phase' where the friction torque is more or less constant. The calculated frictional torque M and the bearing friction energy density $E_b$ for the R0F+ tests are given in Table 7.

In FIG. 10 the results are plotted as the measured yield stress at 25° C. versus the friction energy density $E_b$. The result does not fit onto the Master Curve. The reasons are obvious: the aged PU/E was collected from the 6204-2Z as a mixture of grease from the various parts of the bearing, i.e., from the areas where grease was subjected to shear but also from the areas where the grease was stationary. Therefore, a fraction of the grease will be aged and for sure this volume will be smaller than the total initial fill, which is clearly different from the aging inside the Couette Aging Machine.

A good fit was obtained by multiplying the frictional energy density with a correcting factor $C_e$ so that the bearing frictional energy density $E_b$ can be translated to the corrected input energy density $E_m$ inside the Couette Aging Machine:

$$E_m = C_e \cdot E_b \qquad (7)$$

For each test condition, the correcting factor $C_e$ is presented in Table 7. It is no surprise that this value is small. After all, inside the bearing, a major fraction of the grease is quite immobile after the churning phase and it is not the total volume of grease that will be severely sheared. It is apparent that with the corrected energy ($C_e \cdot E_b$), the R0F+ results follow the Master Curve (FIG. 10). Therefore, the aging Master Curve can be translated to the bearing running time $t_b$ making use of equation 1 and 7:

$$E_m = C_e \cdot E_b = C_e \cdot \frac{M \cdot N \cdot 2\pi}{60} \cdot t_b}{V_b}, \qquad (8)$$

where the unit of the bearing running time $t_b$ is seconds.

Based on the Master Curve parameters in Table 5 and equation 8, the translated Master Curve for PU/E in terms of the ROF+ bearing running time $t_b$ reads:

$$\tau_y = \frac{100 - 10}{1 + 1.1 \cdot \left(C_e \cdot \frac{\frac{M \cdot N \cdot 2\pi}{60} \cdot t_b}{V_b}\right)^{0.34}} + 10. \quad (9)$$

Figure 11:
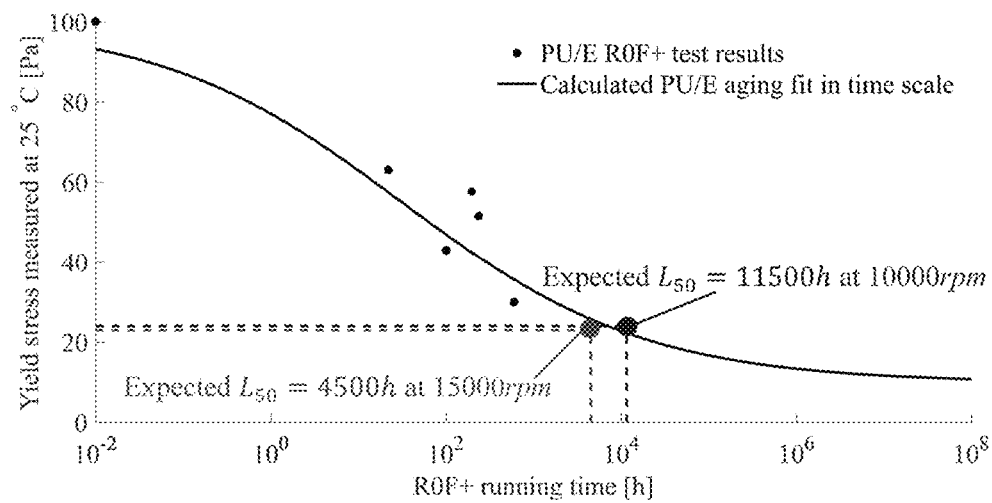
FIG. 11 shows PU/E grease life curve based on the R0F+ results and FIG. 12 shows an upper area of longitudinal section of a ball bearing.

In FIG. 11, the translated Master Curve fits well with the ROF+ results versus the running time. In addition, the grease life calculated from the SKF grease life model is also plotted on the Master Curve, together with the corresponding yield stress value calculated from equation 9: in the case of 15000 rpm, the grease life inside a 6204-2Z bearing is expected to be $L_{50}$=4500 hours, when the yield stress would drop to 23 Pa; in the case of 10000 rpm, $L_{50}$=11500 hours, when the yield stress would drop to 24 Pa.

It is tempting to use the Master Curve, with critical yield stress as a method to predict the grease life. The end-of-grease-life for both operating conditions in the ROF+ test is according to the Master Curve reached at an equal value of the yield stress (23-24 Pa), which is close to the lower limit and suggests that the end of grease life is given by the point in time where the active fraction of the grease has almost lost its consistency. However, this critical yield stress may not be unique. It may be grease, bearing and operating condition dependent.

So, the influence of shear and temperature on the aging of fibrous structured greases has been studied by aging grease inside an in-house-made Couette Aging Machine under controlled shear rate and temperature. The results demonstrate that increasing temperature accelerates the mechanical aging process and that this thermal effect can be described using an Arrhenius correction factor. Based on this, a grease aging model is constructed using the imposed energy corrected for temperature, leading to a Master Curve for the mechanical aging of grease. The Master Curve was validated using a grease worker and was applied to grease aged inside the ROF+ deep groove ball bearings showing that the concept also applies to grease aging in a rolling bearing. This Master Curve could be used as a potential building block or screening method for grease life. It is important to mention that the current model only describes shear degradation. A full grease life model includes all aging components and can only be validated using rolling bearing grease life tests.

Figure 12:
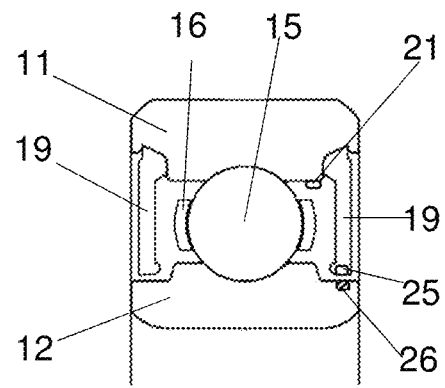

FIG. 12 shows as an embodiment of the invention the upper area of longitudinal section of a ball bearing. Thereby the ball bearing has an outer ring-shaped raceway element 11 and inner ring-shaped raceway element 12, each forming raceways, on which ball-shaped rolling bodies 15, which are arranged between the outer and inner raceway element 11 and 12, are provided to roll off. The rolling bodies 15 are arranged in a cage 16, which prevents that the rolling bodies 15 contact each other directly. Further the ball bearing has two non-contacting sealing shields 19, which seal the environment versus the space with the rolling bodies 15 and the cage 16, which is filled with a lubricating grease. Of course, in other embodiments also contacting seals can be used and/or it is another type of rolling bearing, ball or roller bearing.

Furthermore the ball bearing comprises a temperature sensor 21 to measure the temperature in said space and a speed sensor 25 to measure the speed of the ball bearing, whereby the outer raceway element 11 is e.g. fixed in a housing and the inner raceway element 12 is fixed on an axle which rotates versus the housing during operation. Therefor to detect the speed, a ring-shaped area 26 on the outer jacket of the inner raceway element 12 opposite the speed sensor 25 is designed as a kind of tone wheel. As shown in FIG. 12 the speed sensor 25 is integrated in the right-hand shield 19. Of course, in other embodiments the speed sensor 25 can be arranged elsewhere, does not need to be an integral part of the ball bearing and/or can from a joint element together with the temperature sensor 21, whereby then particularly subunits e.g. for data transmission via wire or wireless, a battery and/or other signal processing units can be used jointly.

The sensed temperature and speed is transmitted to a receiving unit, which can be close to the bearing, but also distance in a control room, calculating from the profiles of the sensed temperature over time and from the speed over time via a calculated energy imposed on the grease a used and/or remaining period of the grease life-time. Thereby the imposed energy is calculated from the profiles via a model comprising the geometry of the ball bearing, particularly via a calculated torque-time-profile, as explained above. Then the imposed energy is correlated with a value of at least one rheological parameter of the grease, particularly the yield stress as explained above, whereby this value determines via a master-curve of the parameter over time being specific for the type of the grease respectively its composition the used and/or remaining period. Thereby the calculated imposed energy comprises a temperature correction reflecting grease aging effects solely due to the temperature.

In case a rolling bearing is not equipped with a temperature and speed sensor as described for the FIG. 12, what means in other words that the profiles over time of the temperature and the speed are not available, the used respectively remaining period of a grease life-time of a lubricating grease which is used in the rolling bearing can be determined via following methods:

Taking a sample of the grease from the rolling bearing,
   determining the value of at least one rheological parameter, particularly the yield stress, of the grease sample, and
   correlating the value of the at least one rheological parameter via a master-curve of the parameter over time being specific for the type of the grease and/or its composition the used and/or remaining period;

or determining a critical rheological parameter, particularly the yield stress, and corresponding critical energy density, particularly using a master-curve and a grease life test result or grease life calculation,
determining a sheared volume of the grease in the bearing and
measure the rheological parameter, obtaining the corresponding energy density, particularly using the master-curve, subtracting the obtained energy density from the critical energy density and resulting therefrom in the remaining period of the grease life-time.

| List of symbols | |
|---|---|
| $C_e$ | Correcting factor for the bearing aging energy (−) |
| $C_T$ | Arrhenius correction factor (−) |
| $E_b$ | Bearing friction energy density (J/mm³) |
| $E_{gw}$ | Modified input work density inside the grease worker (J/mm³) |

-continued

List of symbols

| | |
|---|---|
| $E_m$ | Corrected energy density during the Couette aging procedure (J/mm³) |
| $F_a$ | Axial load applied in the R0F+ test (N) |
| $F_r$ | Radial load applied in the R0F+ test (N) |
| $F_{gw}$ | Friction force generated inside a grease worker (N) |
| K | Coefficient of degradation (–) |
| $L_{50}$ | Estimated bearing life at which 50% of the bearing population has failed (h) |
| $L_{piston}$ | Piston displacement for the grease worker (m) |
| M | Frictional torque (Nm) |
| $M_{rr}$ | Rolling frictional moment generated from the R0F+ bearing (Nm) |
| $M_{sl}$ | Sliding frictional moment generated from the R0F+ bearing (Nm) |
| N | Rotational speed (rpm) |
| n | Degradation exponent (–) |
| $R^2$ | Goodness value of the fitting (–) |
| $S_g$ | Generated entropy per unit volume during aging (J/mm³K) |
| t | Grease aging time (s) |
| $t_b$ | R0F+ bearing running time (s) |
| T | Applied temperature during aging (° C.) |
| $T_0$ | Reference temperature (° C.) |
| $V_a$ | Grease volume inside the Couette Aging Machine (mm³) |
| $V_b$ | Grease filling volume inside the R0F+ test bearings (mm³) |
| $V_{gw}$ | Grease volume inside the grease worker (mm³) |
| W | Input work during the Couette aging procedure (J) |
| Y | Rheological properties of the grease during aging (–) |
| $Y_i$ | Initial rheological value for fresh grease (–) |
| $Y_\infty$ | Second stage rheological value after infinitely long aging (–) |
| $\dot{Y}_a$ | Aging shear rate (s⁻¹) |
| $\dot{Y}_{ps}$ | Shear rate for pre-shear (s⁻¹) |
| $\tau_y$ | Yield stress obtained from the oscillatory strain sweep test (Pa) |

The invention claimed is:

1. A rolling bearing arrangement comprising:
a first ring defining a first raceway,
a second ring defining a second raceway, the first raceway of the first ring and the second raceway of the second ring defining a space between the first ring and the second ring,
a plurality of rolling bodies arranged in the space between the first raceway of the first ring and the second raceway of the second ring so that the first ring and the second ring are rotatable relative to each other,
a grease located in the space and configured to lubricate the rolling bearing arrangement,
at least one sensor located in the space on one of the first ring and the second ring, the at least one sensor being configured to measure a bearing temperature and to measure a bearing speed, and
a receiving unit in communication with the at least one sensor and configured to receive the bearing temperature and the bearing speed, the receiving unit using the bearing temperature as measured over time to generate a temperature profile, the receiving unit using the bearing speed as measured over time to generate a speed profile, the receiving unit being configured to calculate a used and/or remaining period of a life-time of the grease from the speed profile and the temperature profile via a calculated imposed energy associated with the grease.

2. The rolling bearing arrangement of claim 1, wherein the calculated imposed energy is determined from the speed profile and the temperature profile via a model comprising a geometry of the rolling bearing.

3. The rolling bearing arrangement of claim 2, wherein the calculated imposed energy is determined also using a calculated torque-time-profile.

4. The rolling bearing arrangement of claim 1, wherein the calculated imposed energy is correlated with a value of a rheological parameter of the grease, wherein the value determines the used and/or remaining period via a master-curve of the rheological parameter over time specific to a type of the grease and/or a composition of the grease.

5. The rolling bearing arrangement of claim 4, wherein the rheological parameter is the yield stress of the rolling bearing arrangement.

6. The rolling bearing arrangement of claim 1, wherein the calculated imposed energy is calculated using a temperature correction factor to compensate for grease aging effects solely due to the temperature and is used for determining a regressing point in time or interval.

7. The rolling bearing arrangement of claim 6, wherein the calculated imposed energy is also calculated using the used and/or remaining period of the life-time of the grease to determine the regressing point.

8. The rolling bearing arrangement of claim 1, wherein a rheological parameter comprises yield stress, consistency, storage modulus, complex shear modulus, zero-shear-rate-viscosity and complex shear modulus.

9. The rolling bearing arrangement of claim 1, wherein the space is sealed.

10. The rolling bearing arrangement of claim 1, wherein the at least one sensor is wireless and wherein the at least one sensor includes a speed sensor and a temperature sensor which is spaced apart from the speed sensor.

11. The rolling bearing arrangement of claim 1, wherein the calculated imposed energy is calculated using the used and/or remaining period of the life-time of the grease for determining a regressing point in time or interval.

12. A method for determining a used and/or remaining period of a life-time of a grease which is used in a rolling bearing arrangement, the method comprising the steps of:
providing the rolling bearing arrangement, comprising:
a first ring;
a second ring, the first ring and the second ring defining a space therebetween;
the grease being located in the space,
a sensor located in the space,
measuring of the grease of the rolling bearing arrangement by the sensor,
providing a receiving unit in communication with the sensor,
determining a value of a rheological parameter of the grease by the receiving unit, and
correlating, by the receiving unit, the value of the rheological parameter to the used and/or remaining period via a master-curve of the rheological parameter over time specific to a type of the grease and/or a composition of the grease.

13. The method of claim 12, wherein the rheological parameter is the yield stress of the rolling bearing arrangement.

14. A method for determining a used and/or remaining period of a life-time of a grease which is used in a rolling bearing arrangement, the method comprising the steps of:
providing the rolling bearing arrangement, comprising:
a first ring;
a second ring, the first ring and the second ring defining a space therebetween;
the grease being located in the space,
a sensor located in the space,
providing a receiving unit in communication with the sensor,
determining, by a combination of the sensor and the receiving unit, a critical rheological parameter and corresponding critical energy density, determining, by the receiving unit, a sheared volume of the grease in the bearing, and wherein the receiving unit measures the rheological parameter, obtains a corresponding energy density, subtracts the corresponding energy density from the corresponding critical energy density to determine the used and/or remaining period of the life-time of the grease.

15. The method of claim 14, wherein the corresponding energy density is obtained using the master-curve.

16. A rolling bearing arrangement comprising:

a first ring defining a first raceway, a second ring defining a second raceway, the first raceway of the first ring and the second raceway of the second ring defining a space between the first ring and the second ring, a non-contacting sealing shield disposed on the first ring and extending toward, but not contacting, the second ring, a plurality of rolling bodies arranged in the space between the first raceway of the first ring and the second raceway of the second ring so that the first ring and the second ring are rotatable relative to each other, a grease located in the space and configured to lubricate the rolling bearing arrangement, at least one sensor located in the space on one of the first ring, the second ring, and the non-contacting sealing shield, the at least one sensor being configured to measure a bearing temperature and to measure a bearing speed, and a receiving unit in communication with the at least one sensor and configured to receive the bearing temperature and the bearing speed, the receiving unit using the bearing temperature as measured over time to generate a temperature profile, the receiving unit using the bearing speed as measured over time to generate a speed profile, the receiving unit being configured to calculate a used and/or remaining period of a life-time of the grease from the speed profile and the temperature profile via a calculated imposed energy associated with the grease.

* * * * *